United States Patent
Sheridan

(10) Patent No.: US 10,151,248 B2
(45) Date of Patent: Dec. 11, 2018

(54) DUAL FAN GAS TURBINE ENGINE AND GEAR TRAIN

(75) Inventor: William G. Sheridan, Southington, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 2112 days.

(21) Appl. No.: 13/340,838

(22) Filed: Dec. 30, 2011

(65) Prior Publication Data

US 2013/0004297 A1 Jan. 3, 2013

Related U.S. Application Data

(63) Continuation-in-part of application No. 11/906,602, filed on Oct. 3, 2007, now Pat. No. 8,205,432.

(51) Int. Cl.
*F02C 7/36* (2006.01)
*F02K 3/04* (2006.01)
*F16H 57/08* (2006.01)

(52) U.S. Cl.
CPC .......... *F02C 7/36* (2013.01); *F02K 3/04* (2013.01); *F05D 2260/40311* (2013.01); *F16H 57/082* (2013.01)

(58) Field of Classification Search
CPC .... F02C 7/36; F02K 3/04; F05D 2260/40311; F16H 57/082
USPC ............. 60/39.162, 224; 415/122.1; 475/332
See application file for complete search history.

(56) References Cited

U.S. PATENT DOCUMENTS

| | | | |
|---|---|---|---|
| RE25,478 E | 11/1963 | Giri De Termala | |
| 3,287,906 A | 11/1966 | McCormick | |
| 3,729,957 A * | 5/1973 | Petrie et al. | 60/226.1 |
| 4,043,121 A | 8/1977 | Thomas et al. | |
| 4,050,242 A | 9/1977 | Dusa | |
| 4,068,471 A | 1/1978 | Simmons | |
| 4,446,696 A * | 5/1984 | Sargisson et al. | 60/226.3 |
| 4,827,712 A * | 5/1989 | Coplin | 60/226.1 |
| 5,261,227 A | 11/1993 | Giffin, III | |
| 5,305,599 A | 4/1994 | Marvin | |
| 5,466,198 A | 11/1995 | McKibbin et al. | |
| 5,472,383 A | 12/1995 | McKibbin | |

(Continued)

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Darle W. Dudley, "Gear Handbook: The Design, Manufacture, and Application of Gears", p. 3-15, 1962.*

(Continued)

*Primary Examiner* — Carlos A Rivera
(74) *Attorney, Agent, or Firm* — Carlson, Gaskey & Olds, P.C.

(57) ABSTRACT

A gas turbine engine includes a first fan, a second fan spaced axially from the first fan, a turbine-driven fan shaft and an epicyclic gear train coupled to be driven by the turbine-driven fan shaft and coupled to drive the first fan and the second fan. The epicyclic gear train includes a carrier that supports star gears that mesh with a sun gear, and a ring gear that surrounds and meshes with the star gears. The star gears are supported on respective journal bearings.

18 Claims, 4 Drawing Sheets

(56) References Cited

U.S. PATENT DOCUMENTS

| | | | |
|---|---|---|---|
| 5,623,823 A | 4/1997 | Schirle et al. | |
| 5,694,768 A | 12/1997 | Johnson et al. | |
| 5,806,303 A | 9/1998 | Johnson | |
| 5,809,772 A | 9/1998 | Giffin, III et al. | |
| 5,915,917 A | 6/1999 | Eveker et al. | |
| 6,223,616 B1 | 5/2001 | Sheridan | |
| 6,732,502 B2* | 5/2004 | Seda et al. | 60/226.1 |
| 6,901,739 B2 | 6/2005 | Christopherson | |
| 6,964,155 B2* | 11/2005 | McCune et al. | 60/226.1 |
| 7,513,103 B2* | 4/2009 | Orlando et al. | 60/268 |
| 7,526,913 B2* | 5/2009 | Orlando et al. | 60/268 |
| 7,603,844 B2* | 10/2009 | Moniz et al. | 60/268 |
| 7,704,178 B2* | 4/2010 | Sheridan et al. | 475/159 |
| 7,726,113 B2* | 6/2010 | Orlando et al. | 60/39.162 |
| 7,921,634 B2* | 4/2011 | Orlando et al. | 60/204 |
| 7,926,259 B2* | 4/2011 | Orlando et al. | 60/204 |
| 2004/0255590 A1 | 12/2004 | Rago et al. | |
| 2005/0026745 A1 | 2/2005 | Mitrovic | |
| 2005/0241292 A1 | 11/2005 | Taylor et al. | |
| 2006/0130456 A1 | 6/2006 | Suciu et al. | |
| 2006/0251508 A1 | 11/2006 | Norris et al. | |
| 2007/0000232 A1 | 1/2007 | Powell et al. | |
| 2007/0084183 A1 | 4/2007 | Moniz et al. | |
| 2007/0084186 A1* | 4/2007 | Orlando et al. | 60/204 |
| 2007/0084190 A1 | 4/2007 | Moniz et al. | |
| 2007/0087892 A1 | 4/2007 | Orlando et al. | |
| 2008/0098714 A1 | 5/2008 | Orlando et al. | |
| 2009/0000271 A1 | 1/2009 | Kupratis | |
| 2009/0071121 A1 | 3/2009 | Suciu et al. | |
| 2009/0145102 A1* | 6/2009 | Roberge | F01D 1/023 60/39.162 |
| 2009/0320491 A1* | 12/2009 | Copeland | 60/772 |
| 2010/0148396 A1 | 6/2010 | Xie et al. | |
| 2010/0331139 A1 | 12/2010 | McCune | |

OTHER PUBLICATIONS

Hall, C.A. and Crichton, D., "Engine Design Studies for a Silent Aircraft", Journal of Turbomachinery, vol. 129, Jul. 2007, p. 482, second column, first paragraph and Table 2.*

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau K. Gu, C. and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 3-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

Planetary et al. (1983). Gear handbook: The design, manufacture, and application of gears. Jan. 1, 1983. pp. 293-323. Retrieved from:

(56) References Cited

OTHER PUBLICATIONS http://www.webpages.uidaho.edu/mindworks/Machine_Design/Posters/PDF/PlanetaryGears Poster.pdf.
Extended European Search Report for European Patent Application No. 12197864 completed Jun. 2, 2016.

* cited by examiner

DUAL FAN GAS TURBINE ENGINE AND GEAR TRAIN

CROSS REFERENCE TO RELATED APPLICATIONS

The present disclosure is a continuation in part of U.S. patent application Ser. No. 11/906,602, filed Oct. 3, 2007 now U.S. Pat. No. 8,205,432.

BACKGROUND OF THE INVENTION

The present invention is generally directed to gas turbine engines and, more particularly, to gear systems for use in variable cycle gas turbine engines. Typical turbofan gas turbine engines utilize a fan to generate two streams of air for producing thrust. The fan pushes a first stream of inlet air into a core turbine engine where the inlet air is used to sustain a combustion process. The first stream of inlet air is passed through a series of compressors, a combustor and turbines, which are disposed in an axially serial relationship. The compressors increase the density and temperature of the air for carrying out the combustion process in the combustor. High-energy gases resulting from the combustion process are then used to produce thrust and rotate the turbines. Typically, a first turbine is used to drive the compressors for the combustion process, and a second turbine is used to rotate the fan. The fan also pushes a second stream of inlet air around the core engine to directly produce thrust. Typically, each engine is configured with a fixed bypass duct that dictates the engine bypass ratio: the distribution of the inlet air routed to the core engine (primary air) and the inlet air routed around the core engine (bypass air).

Typically, turbofan engines are configured to operate optimally at one set of operating conditions, the design point of the engine. For example, many small military aircraft are configured with low bypass ratio engines, where rapid engine response time and high thrust are desirable. Conversely, high bypass ratio engines achieve lower noise emissions and better fuel efficiency and are therefore well suited for large transportation aircraft. Thus, the design point of a high bypass ratio turbofan is typically configured to operate at cruising conditions such that low thrust specific fuel consumption is achieved. At operating conditions above this design point, such as high-thrust takeoff conditions, specific fuel consumption increases as the engine requires more fuel for marginal thrust increases. Below this design point, specific fuel consumption also decreases as a disproportionate amount of thrust is lost as fuel usage is scaled back. These types of turbofans are sometimes referred to as single cycle engines, as the operating performance of the engine is tied to one specific thermodynamic cycle relating the air flow to the combustion process. Specifically, a single cycle engine is limited by the mass flow rate of the inlet air produced by the fan at any given rotational speed. Thus, an engine designer must choose between efficiency and performance in selecting the design point for a single cycle engine.

The operating range of a turbofan engine, and hence flexibility in the performance of the aircraft in which it is used, can be increased by varying the bypass ratio. Variable cycle engines operate in multiple modes, each with a different thermodynamic cycle in which the mass flow rates of each mode are selected to meet different performance needs. For example, two-cycle engines operate in either a high bypass configuration or a low bypass configuration, in which a variable bypass duct is typically used to divert inlet air from the bypass duct to the core engine. With the added flexibility, however, comes added complexity in matching air flow speeds, pressure ratios, mass flow rates, blade speeds and the like. For example, in order to accommodate the variable bypass duct, two-cycle engines frequently utilize two-stage fans having a large diameter forward section and a small diameter aft section. The forward section is thus able to push inlet air into both the bypass duct and the core engine. In one configuration, however, these fan sections are connected to the same input turbine shaft. Thus, the speeds of each fan section cannot be individually controlled and blade tip speed control difficulties arise. In another configuration, the forward fan is connected to the low pressure turbine shaft and the rear fan is connected to the high pressure turbine shaft. Thus, the speed of each fan is governed by overall engine performance concerns rather than bypass ratio and mass flow rate concerns. There is, therefore, a need for a variable cycle fan section that permits individualized control over the rotational speeds of different fan sections.

SUMMARY OF THE INVENTION

A disclosed example turbine engine according to an exemplary embodiment includes a first fan, a second fan spaced axially from the first fan, a turbine-driven fan shaft, and an epicyclic gear train coupled to be driven by the turbine-driven fan shaft and coupled to drive the first fan and the second fan. The epicyclic gear train including a carrier supporting star gears that mesh with a sun gear, and a ring gear surrounding and meshing with the star gears, the star gears being supported on respective journal bearings.

In a further embodiment of the foregoing turbine engine, the epicyclic gear train is coupled to drive the first fan and the second fan at different rotational speeds.

In a further embodiment of the foregoing turbine engine, the epicyclic gear train is coupled to directly drive the second fan without a rotational speed change relative to the turbine-driven fan shaft and coupled to drive the first fan at a reduced rotational speed relative to the turbine-driven fan shaft.

In a further embodiment of the foregoing turbine engine, the first fan is coupled to be driven from the carrier and the second fan is coupled to be driven from the ring gear.

In a further embodiment of the foregoing turbine engine, the epicyclic gear train has a gear reduction ratio such that $\omega\text{Second-Stage}=\omega\text{First-Stage}\cdot[(NR+Ns)/Ns]$, where $\omega\text{First-Stage}$ is a rotational speed of the first fan, $\omega\text{Second-Stage}$ is a rotational speed of the second fan, NR is the number of teeth on the ring gear and NS is the number of teeth on the sun gear.

In a further embodiment of the foregoing turbine engine, the epicyclic gear train has a gear reduction ratio of greater than or equal to about 2.3.

In a further embodiment of the foregoing turbine engine, the epicyclic gear train has a gear reduction ratio of greater than or equal to 2.3.

In a further embodiment of the foregoing turbine engine, the epicyclic gear train has a gear reduction ratio of greater than or equal to about 2.5.

In a further embodiment of the foregoing turbine engine the epicyclic gear train has a gear reduction ratio of greater than or equal to 2.5.

In a further embodiment of the foregoing turbine engine, the epicyclic gear train has a gear reduction ratio of about 1.37:1.

In a further embodiment of the foregoing turbine engine, the first fan and the second fan define a bypass ratio of greater than about ten (10) with regard to a bypass airflow and a core airflow.

In a further embodiment of the foregoing turbine engine, the first fan and the second fan define a bypass ratio of greater than about 10.5:1 with regard to a bypass airflow and a core airflow.

In a further embodiment of the foregoing turbine engine, the first fan and the second fan define a bypass ratio of greater than ten (10) with regard to a bypass airflow and a core airflow.

In a further embodiment of the foregoing turbine engine, wherein the first fan and the second fan define an overall fan pressure ratio that is less than about 1.45.

In a further embodiment of the foregoing turbine engine, the first fan and the second fan define an overall fan pressure ratio that is that is less than 1.45.

Although different examples have the specific components shown in the illustrations, embodiments of this invention are not limited to those particular combinations. It is possible to use some of the components or features from one of the examples in combination with features or components of another of the examples.

These and other features disclosed herein can be best understood from the following specification and drawings, the following of which is a brief description.

DETAILED DESCRIPTION OF THE PREFERRED EMBODIMENT

Figure 1:
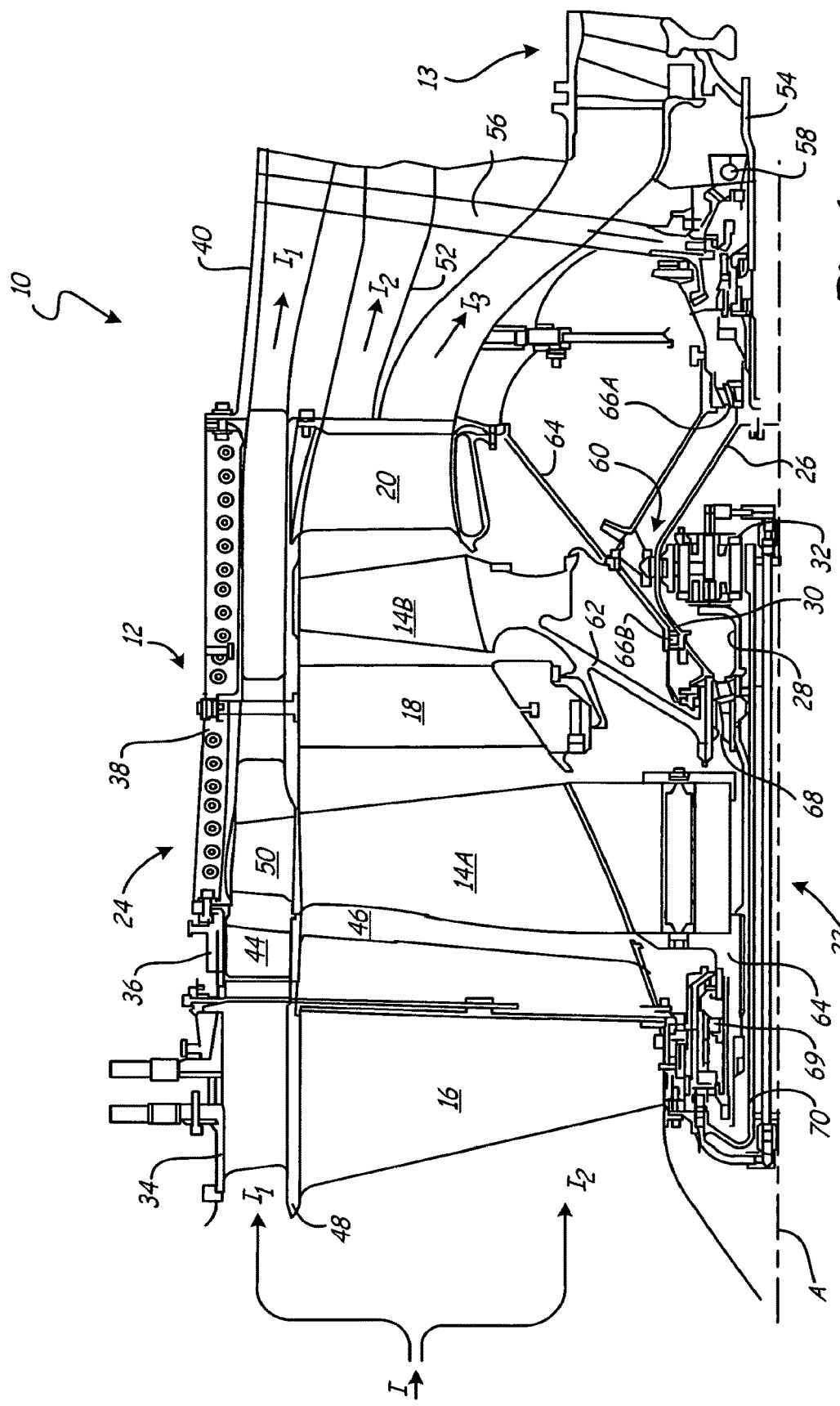
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

FIG. 1 shows a cross sectional view of the propulsive section of variable cycle turbofan engine 10, which includes two-stage fan section 12 configured for delivering multiple streams of inlet air I to turbofan engine 10 in order to vary the bypass ratio of engine 10. Fan section 12 is configured to generate bypass air for producing thrust, and to generate core air for compressing in compressor 13. The core air is used to sustain a combustion process within a core portion (not shown) of engine 10 positioned axially downstream of compressor 13. Two-stage fan section 12 includes first-stage blade 14A and second-stage blade 14B that are inter-disposed between inlet guide vane (IGV) 16, intermediate guide vane 18 and exit guide vane 20. First-stage blade 14A and second-stage blade 14B are joined at their inner diameter ends to fan shaft system 22, and vanes 16, 18 and 20 are joined at their outer diameter ends to engine housing 24. Fan shaft system 22 comprises fan shaft 26, first-stage fan shaft 28, second-stage fan shaft 30 and epicyclic gear system 32. Engine housing 24 comprises inlet case 34, gate 36, fan case 38 and intermediate duct 40. Fan section 12 and fan shaft system 22 comprise radially symmetric systems that are configured for rotating about axis A in FIG. 1. Thus, fan section 12 includes circular arrays of first-stage blades 14A, second-stage blades 14B and vanes 16, 18 and 20, which are mounted to annular shafting members 26, 28 and 30.

Inlet case 34 and fan case 38 are coaxially aligned to form outer bypass duct 44 and main duct 46 for initially splitting inlet air I into first stream I1 and second stream I2. First and second streams I1 and I2 are directed into intermediate duct 40, whereby second stream I2 is further parsed to produce third stream I3. Gate 36 is selectively opened and closed, for example, by an engine control system such as a Full Authority Digital Engine Control (FADEC) (not illustrated), to vary the amount of inlet air I that is permitted to bypass compressor 13. Thus, the amount of thrust directly produced by fan section 12 in proportion to the amount of thrust produced by the core engine changes. Accordingly, the performance of engine 10 can be optimized over a wide range of operating conditions. To further maximize the efficiency and performance of engine 10, fan shaft system 22 is provided with epicyclic gear system 32 to coordinate the rotational speeds of first-stage blades 14A and second-stage blades 14B to produce the required mass flow rate of inlet air I as is needed by engine 10 while avoiding blade tip speed issues.

In the high bypass ratio configuration of engine 10, inlet air I enters inlet case 34 and is directed into outer bypass duct 44 and main duct 46 by IGV 16. Inner annular duct 48, which is provided in segments along inlet case 34, gate 36, first-stage blade 14A and fan case 38, divides inlet air I into first and second streams I1 and I2. First stream I1 is driven by tip-blade 50 of first-stage blade 14A to intermediate duct 40. Second stream I2 is driven by first-stage blade 14A and second-stage blade 14B within main duct 46 to intermediate duct 40. After passing through fan section 12, first stream I, and second stream I2 continue past the core section of engine 10 and are expelled from engine 10 through an exhaust nozzle (not shown) to produce thrust. In various embodiments, second stream I2 is reunited with first stream I1 for passing out of engine 10 at the exhaust nozzle. Intermediate duct 40, however, also includes flow deflector 52 that extracts third stream I3 from second stream I2 for supplying to compressor 13. Compressor 13 compresses third stream I3 such that it can be used in a combustion process to generate high-energy gases for turning turbines that drive compressor 13 and fan section 12.

In order to operate engine 10 in the low bypass ratio configuration, such as to increase the proportion of inlet air I provided to compressor 13, gate 36 is actuated by the FADEC to close-off bypass duct 44. Gate 36 comprises a pivotable door that can be rotated to deflect first stream I, from bypass duct 44 to main duct 46 to increase the mass flow rates of second stream I, and third stream I3. Due to the different operating conditions of engine 10, different demands are placed on first-stage blade 14A and second-stage blade 14B. First-stage blade 14A is configured for driving first stream I1, second stream I2 and third stream I3, while second-stage blade 14B is only configured for driving second stream I2 and third stream I3. First-stage blade 14A is radially longer and generally sturdier than second-stage blade 14B such that first stream I1 can be driven via blades 50. Thus, first-stage blade 14A generates higher tip speed and increased mass flow rates than second-stage blade 14B if rotated at the same speed. It is, however, desirable for both blades to operate near, but below, their respective critical tip speeds. It is also desirable to match the mass flow rates generated by first-stage blade 14A and second-stage blade 14B such that surge, stall or other undesirable engine conditions are avoided within fan section 12. Fan shaft system 22 is therefore provided with epicyclic gear system 32 to individually optimize the rotational speeds of first-stage blade 14A and second-stage blade 14B. Specifically, epicyclic gear system 32 reduces the rotational speed of first-stage blade 14A such that tip-blades 50 do not exceed their critical speed, and first-stage blades 14A do not provide more inlet air I than can be moved by second-stage blades 14B.

Fan shaft 26 is connected with compressor 13 through compressor shaft 54, which is connected with a turbine in the core of engine 10. In one embodiment, compressor 13 is connected to a low pressure turbine disposed axially rearward of a high pressure turbine within the core engine. Compressor shaft 54 is supported within engine 10 by strut 56, which is stationary and connected with intermediate case 40 and bearing 58. In one embodiment of engine 10, strut 56 is connected with an oil dispensing system (not shown) to conduct oil to bearing 58 for lubrication and cooling purposes. Fan shaft 26 extends from compressor shaft 54 and connects with second-stage shaft 30 at connection 60. Second-stage shaft 30 and fan shaft 26 include radially extending flanges that permit additional components of engine 10 and gear system 32 to be secured between second-stage shaft 30 and fan shaft 26. Second-stage shaft 30 is joined with second-stage rotor 62, which drives second-stage blade 14B. Thus, second-stage blade 14B is directly and rigidly connected with fan shaft 26. Fan shaft 26 and second-stage shaft 30 are supported within engine 10 by strut 64, which extends from exit guide vane 20 to bearings 66A and 66B. Connection 60 also links fan shaft 26 to epicyclic gear system 32, which is also connected to first-stage shaft 28. First-stage shaft 28 connects with first-stage rotor 64, which drives first-stage blade 14A. Thus, first-stage blade 14A is connected to compressor shaft 54 through epicyclic gear system 32 and fan shaft 26. First-stage shaft 28 is supported within second-stage rotor 62 by bearing 68 and bearing 69. Stationary torque tube 70 extends from epicyclic gear system 32 to inlet guide vane 16, whereby stationary torque tube 70 is anchored to fan inlet case 34 to provide a static member for supporting epicyclic gear system 32 and to counteract torque loads. Epicyclic gear system 32 comprises a speed-reducing gear system that reduces the rotational speed of first-stage blade 14A to a speed below that of fan shaft 26 and second-stage blade 14B. Accordingly, first-stage blades 14A and second-stage blades 14B rotate at speeds close to their respective tip speed limits. Also, first-stage blades 14A and second-stage blades 14B rotate at speeds that coordinate efficient mass flow of inlet air I through bypass duct 44 and main duct 46 of fan section 12 over a wide range of engine performance parameters.

Figure 2:
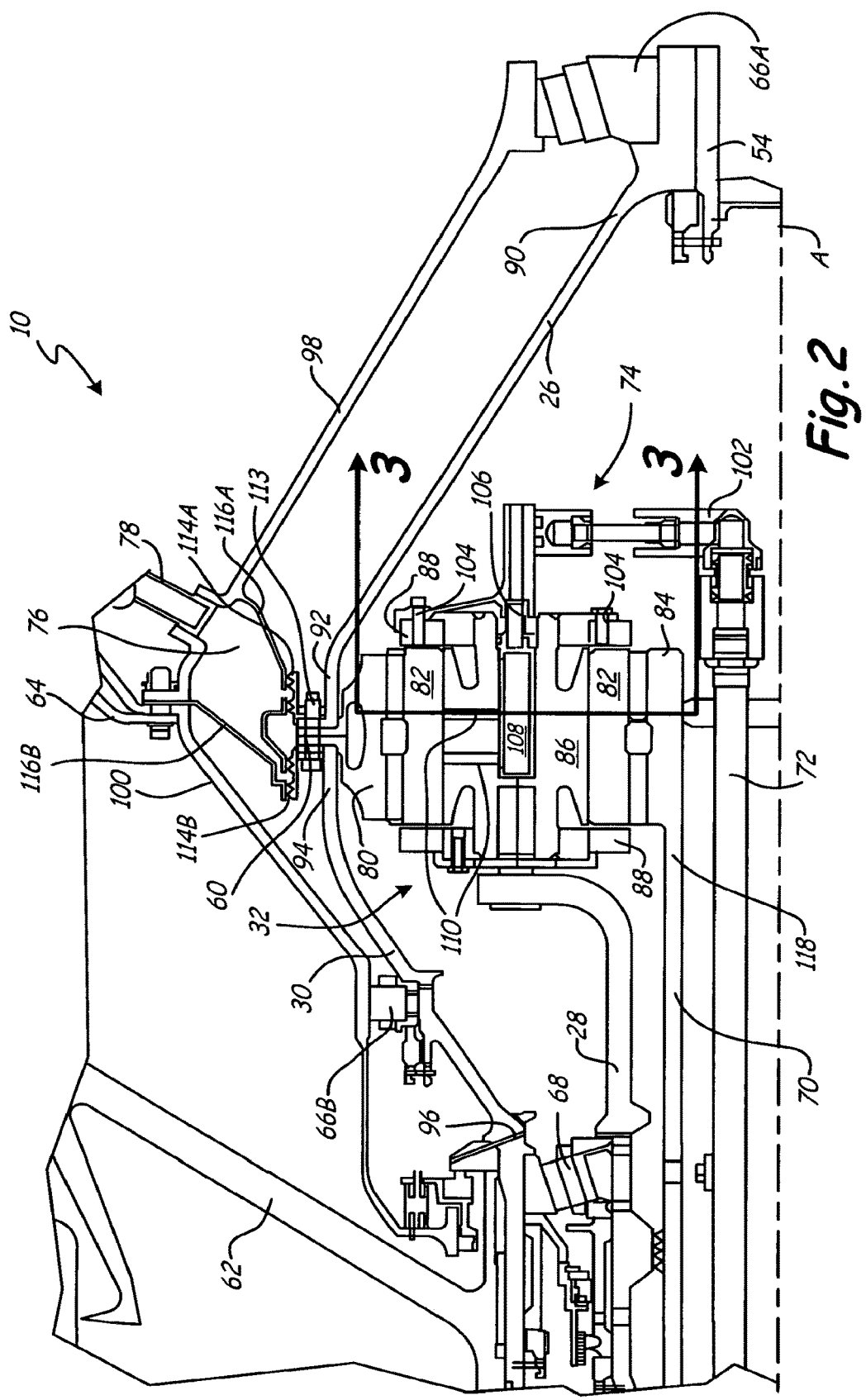
FIG. 2 is an enlarged cross-sectional view of the epicyclic gear train shown in FIG. 1.

FIG. 2 shows a schematic cross section of epicyclic gear system 32 disposed within engine 10 of FIG. 1. Engine 10 includes fan shaft 26, first-stage shaft 28, second-stage shaft 30, epicyclic gear system 32, compressor shaft 54, connection 60, second-stage rotor 62, strut 64, bearings 66A and 66B, bearing 68, and static torque tube 70, as were seen in FIG. 1. Engine 10 also includes oil feed 72, oil manifold 74, oil sump 76 and oil drain 78. Epicyclic gear system 32 comprises ring gear 80, planet gears 82, sun gear 84, journal bearing 86 and carrier 88.

Compressor shaft 54 extends axially forward from the turbine and rotates about centerline A. Fan shaft 26 is connected to the forward end of compressor shaft 54 through, for example, a spline connection at first end 90. Second end 92 of fan shaft 26 is connected to first end 94 of second-stage shaft 28 at connection 60. Second end 96 is connected with second-stage rotor 62 with, for example, a spline connection at second end 96. Together, fan shaft 26 and second-stage shaft 30 form a bulged or arched shaft that connects compressor shaft 54 with second-stage rotor 62. Generally, the bulged or arched portion of shaft formed by fan shaft 26 and second-stage shaft 30 is positioned at flanged connection 60, where epicyclic gear system 32 is connected to fan shaft 26 and second-stage shaft 30. Fan shaft 26 extends axially forward and radially outward from compressor shaft 54, while first end 94 of second-stage shaft 30 extends axially forward and radially inward from second end 92 of fan shaft 26. Second end 96 of second-stage shaft 30 comprises a larger diameter than first end 90 of fan shaft 26, and second end 92 of fan shaft 26 comprises a larger diameter than second end 96 of second-stage shaft 30. As such, the fan shaft 26 and second-stage shaft 30 provide a means for fan shaft 26 to extend past epicyclic gear system 32 in a radially compact manner, while still permitting first-stage shaft 28 and static torque tube 70 to connect with epicyclic gear system 32.

Static torque tube 70 extends coaxially about axis A from a stationary member within engine 10, such as illustrated in FIG. 1, such that torque tube 70 provides a non-rotating member upon which to anchor gear system 32. Thus, gear system 32 is suspended within engine 10 between static torque tube 70 and shafts 26 and 30. First-stage shaft 28 extends from gear system 32 between torque tube 70 and second-stage shaft 30, past second-stage rotor 62, to support first-stage rotor 64. Compressor shaft 54 is rotated by a turbine located within the core of gas turbine engine 10. As the core gas turbine engine rotates compressor shaft 54, fan shaft 26 and second-stage shaft 30 rotate second-stage rotor 62 at the same speed. Through the gear reduction of epicyclic gear system 32, first-stage shaft 28 rotates first-stage rotor 64 about axis A at a slower rate than the rate at which second-stage shaft 30 rotates about axis A.

First end 90 of fan shaft 26 is supported within engine 10 by bearing 66A, which rides on wing 98 of strut 64. Second end 96 of second-stage shaft 30 is supported by bearing 66B, which rides on wing 100 of strut 64. Bearing 68 supports first-stage shaft 28 within second-stage shaft 30. Bearing 68 is configured to react the radial and thrust loads from first stage fan blades 14A, and transmits these loads to second-stage fan shaft 30 and fan shaft 26. In the embodiment shown, bearing 66A comprises a tapered roller bearing, bearing 66B comprises a roller bearing and bearing 68 comprises a tapered roller bearing, but in other embodiments of the invention; tapered, roller or ball bearings may be used as needed in various designs.

Figure 3:
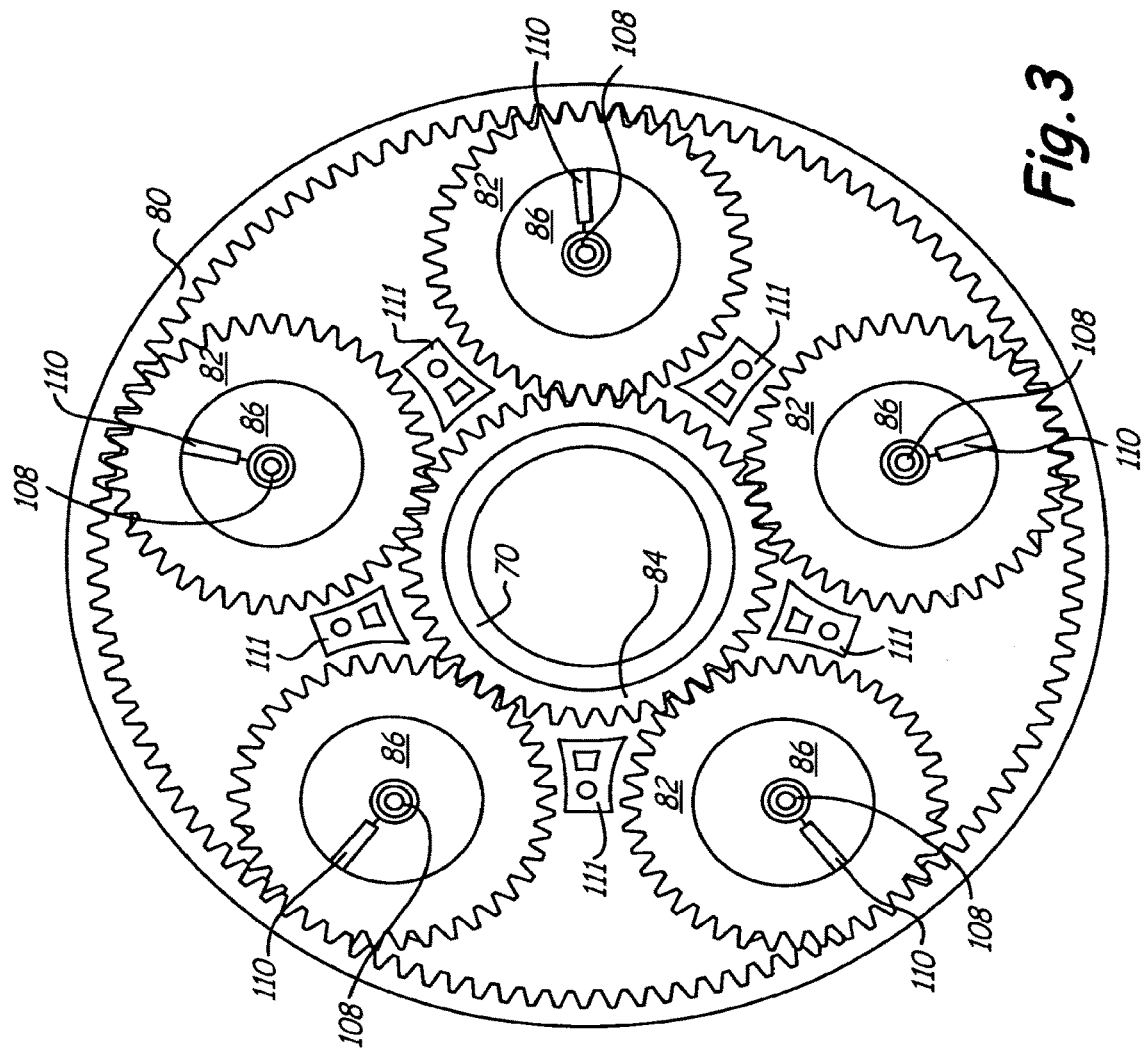
FIG. 3 is an enlarged cross-sectional view of an example ring gear similar to the arrangement shown in FIG. 2.
Figure 4:
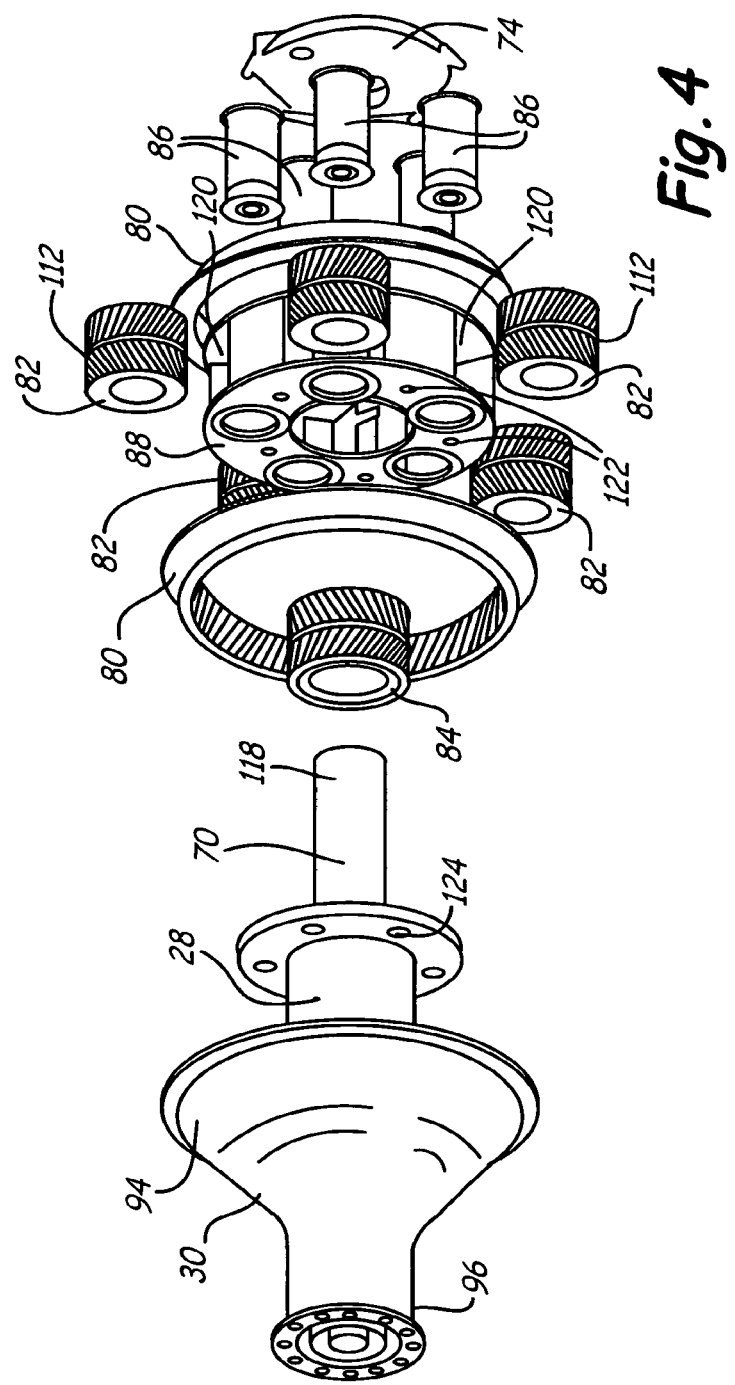
FIG. 4 is a view of the ring gear shown in FIG. 3 viewed in a direction that faces the teeth of the ring gear in FIG. 3.

FIG. 3 shows a schematic, front view of epicyclic gear system 32 of FIG. 2. FIG. 3 shows the plurality of planet gears 82 situated within carrier 88 as would be taken at section 3-3 of FIG. 2. FIG. 4 shows an exploded view of epicyclic gear system 32 of FIG. 2. When viewed in conjunction with each other, FIGS. 1 through 4 illustrate the lubrication system included with engine 10 to provide oil to epicyclic gear system 32. Static torque tube 70 is stationary within engine 10 such that oil feed 72 is readily extended through static torque tube 70 to provide oil to epicyclic gear system 32. The forward end of oil feed 72 is connected to an oil dispensing system (not shown), while the downstream end of oil feed 72 is connected with universal joint 102 that connects with oil manifold 74. Oil manifold 74 is connected with carrier 88 with, for example, fasteners 104. Universal joint 102 allows oil manifold 74 to rotate with carrier 88, while oil feed 72 remains static. Lubricating oil travels through oil feed 72 and universal joint 102 and, through centrifical force, into oil manifold 74. Oil manifold 74 includes fittings 106 that dispense the lubricating oil into internal cavities 108 within journal bearings 86. Journal bearings 86 include radially extending passages 110 that permit the lubricating oil to enter the interfaces between planet gears 82 and journal bearings 86. The lubrication oil thereafter axially spreads across the journal/gear interface and is directed by a deflector (not shown) within carrier 88 to the interfaces of planet gears 82 with ring gear 80 and sun gear 84 by carrier 88. Additionally, as seen in FIG. 3, epicyclic gear system 32 is provided with oil baffles 111 that force lubrication oil into the teeth of gears 80, 82 and 84. Baffles 111 are configured to ride in circumferential grooves 112 (FIG. 4) within planet gears 82. Thus, during operation of engine 10, oil is centrifically pushed through epicyclic gear system 32 to provide lubrication and cooling of gears 80, 82 and 84. U.S. Pat. No. 6,223,616 by Sheridan, which is herein incorporated by this reference, explains in greater detail a lubrication system suitable for use in another embodiment of epicyclic gear system 32 of the present invention.

Engine 10 is also provided with an oil collection system and emergency oil distribution system. Wings 98 and 100 are connected to strut 64 with threaded fastener 113, and come together to form oil sump 76 above connection 60. Wing 98 includes an opening such that oil drain 78 has access to the area between wing 98 and fan shaft 26. Knife edge seals 114A and 114B are bolted to flanged connection 60 such that seal 114B is above second-stage shaft 30 and seal 114A is above fan shaft 26. Deflectors 116A and 116B extend from wings 98 and 100, respectively, to abut seals 114A and 116B, respectively. As such, a passageway is formed between connection 60 and oil drain 78. Lubricating oil is pushed through epicyclic gear system 32 and toward connection 60 through centrifical operation of engine 10. The lubrication oil is permitted to seep through connection 60 and into sump 76 whereby oil drain 78 collects the used lubrication oil. In one embodiment, oil drain 78 is connected with a two-way pump, which collects the dispensed oil. Acting in suction mode, the pump collects the dispersed lubrication from epicyclic gear system 32, whereby the oil is routed through filters and returned to various oil dispensing systems within engine 10, such as those used in conjunction with strut 56 (FIG. 1), or oil feed 72. In an emergency situation, the pump can be operated in pump mode to dispense the lubrication oil from a storage tank, such as used in conjunction with strut 56 or oil feed 72, to sump 76 and forced into epicyclic gear system 32. Thus, epicyclic gear system 32 includes means for permitting lubrication oil to be circulated through gears 80, 82 and 84 utilizing various systems located within engine 10.

When viewed collectively, FIGS. 1 through 4 also illustrate the gear reduction achieved by epicyclic gear system 32. As noted above, static torque tube 70 is fixedly disposed within engine 10. Sun gear 84 is rigidly affixed to first end 118 of torque tube 70 such that sun gear 84 is also non-rotating and coaxial with axis A. Sun gear 84 is, in one embodiment, force fit onto torque tube 70. Gear carrier 88 includes a central bore into which sun gear 84 and static torque tube 70 are concentrically disposed. Planet gear 82 is disposed within gear slot 120 of gear carrier 88 and comprises one of a plurality of planet gears circumferentially arranged within gear slots of gear carrier 88. Gear carrier 88 comprises a pair of plates positioned on the forward and aft sides of planet gears 82 to provide a carriage for synchronizing the rotation and maintaining spacing of the plurality of planet gears 82 about sun gear 84 and axis A. A plurality of journal pins 86 extend through gear slots 120 and provide an axis upon which the plurality of planet gears 82 rotate. Journal pins 86 include internal cavities 108 and radial passages 110 that receive a lubrication fluid from oil manifold 74. Ring gear 80 is disposed concentrically about gear carrier 88 to engage planet gears 82. In the embodiment shown, ring gear 80 comprises forward and aft portions that are bolted together at connection 60 through a flanged coupling to form an annular body that rotates about axis A. Planet gears 82 include gear teeth that mesh with gear teeth of planet gear 82 and sun gear 84. In one embodiment, ring gear 80, sun gear 84 and planet gears 82 include double-helical, or herringbone, tooth configurations that facilitate flow of lubrication oil through epicyclic gear system 32.

Ring gear 80 of epicyclic gear system 32 is connected to fan shaft 26 and second stage shaft 30 through flanged connection 60. Fan shaft 26 is connected to compressor shaft 54 such that fan shaft drives ring gear 80 at the same speed as compressor shaft 54. Likewise, second-stage shaft 30 is connected to second-stage rotor 62 to drive second-stage fan blades 14B at the same speed as compressor shaft 54. Thus, second-stage fan blades 14B are directly driven by compressor shaft 54 without needing to go through a gear reduction system. Ring gear 80 is also directly driven by compressor shaft 54 to drive first-stage shaft 28 through planet gears 82 and sun gear 84. First-stage shaft 28 is connected to carrier 88 with, for example, threaded fasteners at bores 122 of carrier 88 and bores 124 of first-stage shaft 28. In other embodiments, second-stage shaft 28 is connected to carrier 88 using a flexible torque plate coupling in conjunction with bores 122, as is described in U.S. Pat. No. 5,466,198 by McKibbin et al., which is herein incorporated by this reference. As compressor shaft rotates ring gear 80, ring gear 80 spins planet gears 82 around stationary sun gear 84. Planet gears 82 pull gear carrier 88 about axis A in the same rotational direction as ring gear 80, but at a reduced rate. Thus, first stage shaft 28 is driven to rotate about axis A in the same direction as second-stage shaft 30, but at a slower speed.

Epicyclic gear system 32 achieves a reduction in the rotational speed of first-stage shaft 28 commensurate with optimal operation of two-stage fan section 12. For example, differential gear systems, in which the sun gear, the carrier and the ring gear all rotate, have been employed to rotate counter-rotating fan sections in other gas turbine propulsion systems. Differential gear reduction systems, however, achieve gear reduction ratios on the order of 8:1 or more, which would result in the first-stage fan shaft rotating at about thirteen percent of that of the second-stage fan shaft. In co-rotating, two-stage turbofans, it is desirable that the two fan stages rotate at similar speeds such that mass flows generated by each stage are closely matched. With the gear system of the present invention, in which sun gear 84 is maintained stationary by static torque tube 70, lower gear reduction ratios are attainable, as is illustrated by equation (1), where NR is the number of teeth in ring gear 80 and Ns is the number of teeth in sun gear 84.

$$(NR+Ns)/NR \qquad \text{Equation (1)}$$

In one embodiment of epicyclic gear system 32, the ring gear has 117 teeth, the planet gears have 37 teeth, and the sun gear has 43 teeth such that a gear reduction ratio of about 1.37:1 is achieved. Thus, the rotational speed of first-stage fan shaft 28 is reduced to about seventy-three percent of that of second-stage fan shaft 30, as is illustrated by equation (2), where $\omega_{Second-Stage}$ is the rotational speed of second-stage shaft 30 and $\omega_{First-Stage}$ is the rotational speed of first-stage shaft 28.

$$\omega_{Second-Stage} = \omega_{First-Stage} \cdot [(NR+Ns)/NR] \quad \text{Equation (2)}$$

In another embodiment of the invention, the rotational speed of first-stage fan shaft 28 is reduced to about eighty-three percent of that of second-stage fan shaft 30.

In one disclosed, non-limiting embodiment, the engine 10 has a bypass ratio that is greater than about six (6) to ten (10), the epicyclic gear train 22 is a planetary gear system or other gear system with a gear reduction ratio of greater than about 2.3 or greater than about 2.5, and a low pressure turbine of the engine 10 has a pressure ratio that is greater than about 5. In one disclosed embodiment, the engine 10 bypass ratio is greater than about ten (10:1) or greater than 10.5:1, the diameter of at least one of the fans 14A or 14B is significantly larger than that of the low pressure compressor 13, and the low pressure turbine has a pressure ratio that is greater than 5:1. In one example, the epicyclic gear train 22 has a gear reduction ratio of greater than about 2.3:1 or greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fans of the engine 10 are designed for a particular flight condition—typically cruise at about 0.8M and about 35,000 feet. The flight condition of 0.8 M and 35,000 ft, with the engine at its best fuel consumption—also known as "bucket cruise TSFC"—is the industry standard parameter of 1 bm of fuel being burned divided by 1 bf of thrust the engine produces at that minimum point. "Low fan pressure ratio" is the pressure ratio across the fan blade alone. The low overall fan pressure ratio across the first and second fans as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7)^{0.5}]$. The "Low corrected fan tip speed" as disclosed herein according to one non-limiting embodiment is less than about 1150 ft/second.

Additionally, epicyclic gear system 32 achieves more efficient torque transfer from compressor shaft 54 to first-stage shaft 28 and second-stage shaft 30. Typical counter-rotating fan gas turbine propulsion systems utilize a differential gear system that transfers power from a single rotational input to two rotational outputs. Thus, both power outputs are derived from the gear system, which produces inefficiencies in the power transfer and requires more robust gear systems. Epicyclic gear system 32 of the present invention, however, permits power from compressor shaft 54 to be directly transferred to second-stage shaft 30. Second-stage shaft 30 is directly coupled to compressor shaft 54 through fan shaft 26. Thus, gear reduction inefficiencies only result in transferring power to first-stage shaft 28 from epicyclic gear system 32. Also, since only first-stage shaft 28 receives power from gear system 32, gear system 32 need only be sufficiently robust to transfer a portion of the power of compressor shaft 54, rather than all of the power of compressor shaft 54. This also permits epicyclic gear system 32 to achieve smaller diameters and more compact designs.

Although the present invention has been described with reference to preferred embodiments, workers skilled in the art will recognize that changes may be made in form and detail without departing from the spirit and scope of the invention.

What is claimed is:

1. A turbine engine comprising:
a first fan;
a second fan spaced axially from the first fan;
a turbine-driven fan shaft; and
an epicyclic gear train that is coupled to be driven by the turbine-driven fan shaft and that is coupled to drive the first fan and the second fan, the epicyclic gear train including a carrier supporting intermediate gears that mesh with a sun gear, and a ring gear surrounding and meshing with the intermediate gears, the intermediate gears being supported on respective journal bearings, wherein the epicyclic gear train has a gear reduction ratio such that $\omega_{Second-stage} = \omega_{First-stage} \times [(NR+Ns)/NR]$, where $\omega_{First-stage}$ is a rotational speed of the first fan, $\omega_{Second-stage}$ is a rotational speed of the second fan, NR is the number of teeth on the ring gear and NS is the number of teeth on the sun gear.

2. The turbine engine as recited in claim 1, wherein the epicyclic gear train is coupled to directly drive the second fan without a rotational speed change relative to the turbine-driven fan shaft and coupled to drive the first fan at a reduced rotational speed relative to the turbine-driven fan shaft.

3. The turbine engine as recited in claim 1, wherein the first fan is coupled to be driven from the carrier and the second fan is coupled to be driven from the ring gear.

4. The turbine engine as recited in claim 1, wherein the epicyclic gear train has a gear reduction ratio of greater than or equal to 2.3.

5. The turbine engine as recited in claim 1, wherein the epicyclic gear train has a gear reduction ratio of greater than or equal to 2.5.

6. The turbine engine as recited in claim 1, wherein the epicyclic gear train has a gear reduction ratio of about 1.37:1.

7. The turbine engine as recited in claim 1, wherein the first fan and the second fan define a bypass ratio of greater than ten (10) with regard to a bypass airflow and a core airflow.

8. The turbine engine as recited in claim 1, wherein the first fan and the second fan define an overall fan pressure ratio that is that is from 1 to 1.45.

9. The turbine engine as recited in claim 1, wherein the ring gear is a rotatable input, the sun gear is fixed, and the carrier is a rotatable output, and wherein the carrier is coupled with a first-stage shaft, the first-stage shaft is coupled with the first fan, the ring gear is coupled at a common connection to the turbine-driven shaft and a second-stage shaft, and the second-stage shaft is coupled with the second fan.

10. The turbine engine as recited in claim 9, wherein the first fan and the second fan are coupled to be driven in a common rotational direction.

11. The turbine engine as recited in claim 1, further comprising a bypass duct, and the first fan and the second fan are in the bypass duct.

12. The turbine engine as recited in claim 11, wherein the first fan and the second fan are, at least in part, both axially forward of the epicyclic gear train.

13. A turbine engine comprising:
a bypass duct;
a forward fan and an aft fan in the bypass duct;

a turbine-driven shaft; and an epicyclic gear train through which the turbine-driven shaft is coupled such that the aft fan is rotatable through the epicyclic gear train at a first speed and the forward fan is rotatable through the epicyclic gear train at a second speed that is lower than the first speed, wherein the forward fan and the aft fan are rotatable in a common rotational direction.

14. The turbine engine as recited in claim 13, wherein the epicyclic gear train has a gear reduction ratio of greater than or equal to 2.3.

15. The turbine engine as recited in claim 13, wherein the epicyclic gear train has a gear reduction ratio of greater than or equal to 2.5.

16. The turbine engine as recited in claim 13, wherein the epicyclic gear train has a gear reduction ratio of greater than or equal to 1.37.

17. The turbine engine as recited in claim 13, wherein the epicyclic gear train includes a carrier supporting intermediate gears that mesh with a sun gear, a ring gear surrounding and meshing with the intermediate gears, and the intermediate gears are supported on respective journal bearings, and wherein the ring gear is a rotatable input, the sun gear is fixed, and the carrier is a rotatable output.

18. The turbine engine as recited in claim 17, wherein the carrier is coupled with a first-stage shaft, the first-stage shaft is coupled with the forward fan, the ring gear is coupled at a common connection to the turbine-driven shaft and a second-stage shaft, and the second-stage shaft is coupled with the aft fan.

* * * * *